(12) United States Patent
Modric et al.

(10) Patent No.: US 10,295,730 B2
(45) Date of Patent: May 21, 2019

(54) LIGHT BAR FOR BACK LIGHT UNIT CONTAINING RESISTANCE MODULATED LED STRINGS

(71) Applicant: GLO AB, Lund (SE)

(72) Inventors: Miljenko Modric, Santa Clara, CA (US); Kazunori Okui, Newark, CA (US); Clinton Carlisle, Sunnyvale, CA (US)

(73) Assignee: GLO AB, Lund (SE)

( * ) Notice: Subject to any disclaimer, the term of this patent is extended or adjusted under 35 U.S.C. 154(b) by 172 days.

(21) Appl. No.: 15/236,760

(22) Filed: Aug. 15, 2016

(65) Prior Publication Data

US 2017/0052313 A1    Feb. 23, 2017

Related U.S. Application Data

(60) Provisional application No. 62/206,603, filed on Aug. 18, 2015.

(51) Int. Cl.
| | |
|---|---|
| *H05B 37/02* | (2006.01) |
| *F21V 8/00* | (2006.01) |
| *H05B 33/08* | (2006.01) |
| *G02F 1/1335* | (2006.01) |

(52) U.S. Cl.
CPC ......... *G02B 6/0073* (2013.01); *G02B 6/0068* (2013.01); *G02B 6/0083* (2013.01); *G02F 1/1335* (2013.01); *H05B 33/086* (2013.01); *G02B 6/0055* (2013.01)

(58) Field of Classification Search
CPC .............. H05B 33/0827; H05B 33/083; H05B 33/0833; H05B 33/0845; F21Y 2115/10

USPC ... 315/185 R, 291, 307, 294, 312, 191, 192; 362/800, 231, 249.06, 612; 345/102, 69
See application file for complete search history.

(56) References Cited

U.S. PATENT DOCUMENTS

| | | | |
|---|---|---|---|
| 8,354,800 B2* | 1/2013 | Stack | H05B 33/0809 315/201 |
| 8,957,590 B1* | 2/2015 | Peng | H05B 33/0827 315/185 S |

(Continued)

FOREIGN PATENT DOCUMENTS

WO    WO 2015/042537 A1    3/2015

OTHER PUBLICATIONS

U.S. Appl. No. 14/493,129, filed Sep. 22, 2014, Wang et al.

*Primary Examiner* — Tung X Le
(74) *Attorney, Agent, or Firm* — The Marbury Law Group PLLC (57) ABSTRACT

A light bar includes a plurality of first color light emitting LEDs including a first subset of first color light emitting LEDs and a second subset of first color light emitting LEDs, a plurality of second color light emitting LEDs, where the second color is different from the first color, and a plurality of third color light emitting LEDs, where the third color is different from the first and the second colors. The second subset of first color light emitting LEDs are electrically connected in series with a larger electrical load than the first subset of first color light emitting LEDs. This light bar electrical configuration allows compensation and correction for locations on the light guide plate used in back light units where imperfect mixing of the 3 primary colors provided by the individual LED emitters on the light bar occurs.

20 Claims, 9 Drawing Sheets

(56) References Cited

U.S. PATENT DOCUMENTS

| | | | | |
|---|---|---|---|---|
| 2007/0216322 A1* | 9/2007 | Kim | ................ | G09G 3/3406 |
| | | | | 315/312 |
| 2007/0236447 A1* | 10/2007 | Lee | ................ | G09G 3/3413 |
| | | | | 345/102 |
| 2009/0213575 A1* | 8/2009 | Blumel | ............ | G02F 1/133603 |
| | | | | 362/97.3 |
| 2010/0109537 A1* | 5/2010 | Nishino | ............ | H05B 33/0827 |
| | | | | 315/185 R |
| 2013/0002153 A1* | 1/2013 | Liu | ................ | H05B 33/086 |
| | | | | 315/185 R |
| 2014/0103812 A1* | 4/2014 | Roberts | ............ | H05B 33/0869 |
| | | | | 315/151 |
| 2015/0085524 A1 | 3/2015 | Wang et al. | | |
| 2015/0351169 A1* | 12/2015 | Pope | ................ | H05B 33/086 |
| | | | | 315/193 |
| 2016/0133180 A1* | 5/2016 | Shida | ............ | H05B 33/0896 |
| | | | | 345/690 |

* cited by examiner

FIG. 9 ably the same first current and the second subset of first color light emitting LEDs are provided with a second current which is lower than the first current such that the first subset of first color light emitting LEDs emit a higher intensity first color light than the second subset of first color light emitting LEDs.

LIGHT BAR FOR BACK LIGHT UNIT CONTAINING RESISTANCE MODULATED LED STRINGS

FIELD

The embodiments of the present disclosure are directed generally to semiconductor light emitting devices and specifically to a light bar for an integrated back light unit, and a method of manufacturing the same.

BACKGROUND

Light emitting devices such as light emitting diodes (LEDs) are used in electronic displays, such as liquid crystal displays in laptop computers or LED televisions. Conventional LED units are fabricated by mounting LEDs to a substrate, encapsulating the mounted LEDs and then optically coupling the encapsulated LEDs to an optical waveguide, such as a light guide plate in a back light unit of a liquid crystal display. Some of the problems that conventional LED units can suffer include general lack of color uniformity across the light guide plate.

SUMMARY

A light bar includes a plurality of first color light emitting LEDs including a first subset of first color light emitting LEDs and a second subset of first color light emitting LEDs, a plurality of second color light emitting LEDs, where the second color is different from the first color, and a plurality of third color light emitting LEDs, where the third color is different from the first and the second colors. The second subset of first color light emitting LEDs are electrically connected in series with a larger electrical load than the first subset of first color light emitting LEDs. This light bar electrical configuration allows compensation and correction for locations on the light guide plate used in back light units where imperfect mixing of the 3 primary colors provided by the individual LED emitters on the light bar occurs. This compensation and correction can be easily customized to different physical dimensions and geometries for the light bars and LED emitter arrays and/or the light guide plates to which the LEDs supply illumination.

According to an aspect of the present disclosure, a light bar includes a plurality of first color light emitting LEDs including a first subset of first color light emitting LEDs and a second subset of first color light emitting LEDs, a plurality of second color light emitting LEDs, where the second color is different from the first color, and a plurality of third color light emitting LEDs, where the third color is different from the first and the second colors. The second subset of first color light emitting LEDs are electrically connected in series with a larger electrical load than the first subset of first color light emitting LEDs.

According to another aspect of the present disclosure a method of operating a light bar comprises emitting a first color light from a plurality of first color light emitting LEDs comprising a first subset of first color light emitting LEDs and a second subset of first color light emitting LEDs, emitting a second color light from a plurality of second color light emitting LEDs, wherein the second color is different from the first color, and emitting a third color light from a plurality of third color light emitting LEDs, wherein the third color is different from the first and the second colors. The first subset of first color light emitting LEDs and the plurality of third color light emitting LEDs are provided with substantially the same first current and the second subset of first color light emitting LEDs are provided with a second current which is lower than the first current such that the first subset of first color light emitting LEDs emit a higher intensity first color light than the second subset of first color light emitting LEDs.

DETAILED DESCRIPTION

In one embodiment, color uniformity in a back light unit including a light emitting device, such as a light bar, can be improved by selectively adding at least one resistive load to a subset of LED strings located on the edge of the light bar. Throughout the drawings, like elements are described by the same reference numerals. The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure.

As used herein, an "integrated back light unit" refers to a unit that provides the function of illumination for liquid crystal displays (LCDs) or other devices that display an image by blocking a subset of background illumination from the side or from the back. As used herein, a "light emitting device" can be any device that is capable of emitting light in the visible range (having a wavelength in a range from 400 nm to 800 nm), in the infrared range (having a wavelength in a range from 800 nm to 1 mm), or in the ultraviolet range (having a wavelength is a range from 10 nm to 400 nm). The light emitting devices of the present disclosure include light emitting devices as known in the art, and particularly the semiconductor light emitting diodes (LEDs) emitting light in the visible range.

As used herein, a "light emitting device assembly," or an "LED assembly" refers to an assembly in which at least one light emitting device, such as at least one LED, is structurally fixed with respect to a support structure, which can include, for example, a substrate, a matrix, or any other structure configured to provide stable mechanical support to the at least one light emitting device.

As used herein, a "light bar" refers to a light emitting device assembly and supporting electrical and structural elements that structurally supports the light emitting device assembly and provides electrical wiring used for operation of the light emitting device assembly.

As used herein, a "light guide unit" refers to a unit configured to guide light emitted from at least one light emitting device in a light emitting device assembly in a direction or directions that are substantially different from the initial direction of the light as emitted from the at least one light emitting device. A light guide unit of the present disclosure may be configured to reflect or scatter light along a direction different from the initial direction of the light as emitted from the at least one light emitting device. In one embodiment, the light guide unit of the present disclosure includes a light guide plate, and may be configured to reflect light along directions about the surface normal of the bottom surface of the light guide plate, i.e., along directions substantially perpendicular to the bottom surface of the light guide plate. An integrated back light unit can include a combination of a light bar, a light guide unit, and optional components that structurally support the light bar and the light guide unit.

As used herein, the "Commission Internationale de l'Eclairage model," or the "CIE model" is a color model based on human perception developed by the CIE (Commission Internationale de l'Eclairage) committee as established in 1931. As used herein, a "CIEx" is the x-coordinate value of a color in a CIE model, and a "CIEy" is the y-coordinate value of a color in the CIE model.

Figure 1:
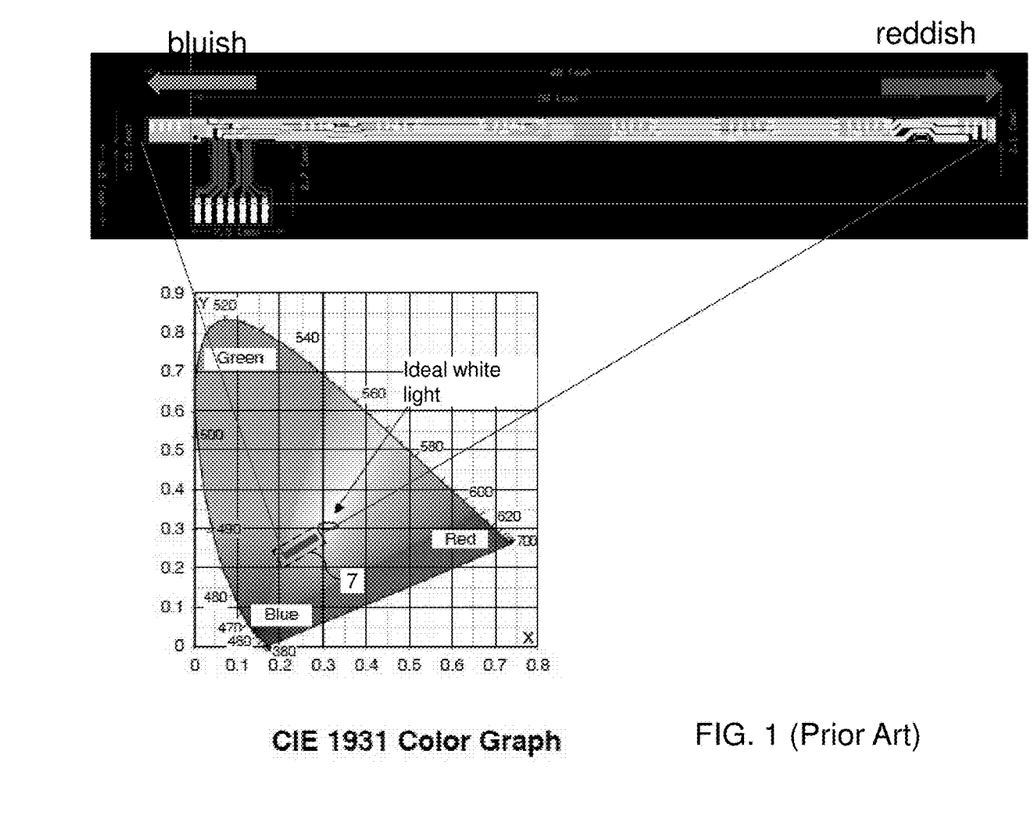
FIG. 1 is a schematic illustration of color variations on a CIE chromaticity diagram of an LED light bar from one to the other side of the light bar.

Referring to FIG. 1, a color graph illustrating the color variations of light emitted from a conventional light bar containing red, blue and green LEDs, from one side to the other side of the light bar. The light bar may be used to illuminate one edge of a light guide plate in a back light unit. Multiple instances of a set of a red LED, a blue LED, and a green LED are repeated along the lengthwise direction of the LED assembly within the light bar to provide generally white light including all three colors at the light guide plate. In other words, the combination of the red, blue and green colors appears as white light to a human observer, and the white light is provided into a light guide plate of a back light unit in a display device.

A light bar as known in the art displays an imbalance in the observed white point as measured at multiple points on a light guide plate near the ends of the bar, i.e., near the first and last light emitting diodes within the light emitting device assembly. The white point is defined as the point on a color graph that corresponds to the composition of the red, blue, and green component of the measured light.

The imbalance in the observed white point is illustrated in FIG. 1. The variations in the white points as the measurement point moves from one end of an LED assembly to the opposite end of the LED assembly is illustrated as a streak 7 within the color graph. The variations in the white points as manifested by the streak 7 is due to the requirement that a red die is located at one extreme and a blue die is located at the opposite extreme end within the LED assembly in the light bar. In practice, variations on the order of about 10% can be observed in CIEx and CIEy within a CIE model among locations corresponding to the extreme edges of the LED assembly.

In one embodiment, one or more resistive load (e.g., electrical resistor) is provided in series and in parallel with the strings of individual red and blue LEDs located at the edge of the light bar containing red, blue and green LED strings. The light bar may be used as an illumination source in various back light units (BLU) for display systems. The added resistor(s) can be used in conjunction with other techniques commonly employed in BLUs for improving color uniformity, such as the design of the optical elements in the light guide plate (LGP), use of various thin-film reflectors and diffusers, etc. This device can be easily implemented and mass-produced, giving it advantages over techniques that require special tuning or feedback signal-driven dynamic compensation.

Figure 2A:
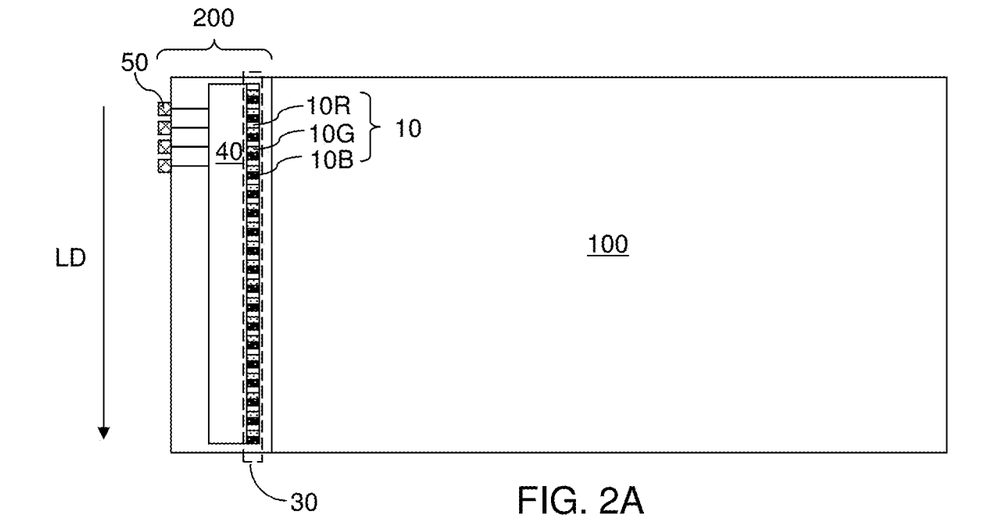
FIG. 2A is a top-down view of an exemplary integrated back light unit according to an embodiment of the present disclosure.
Figure 2B:
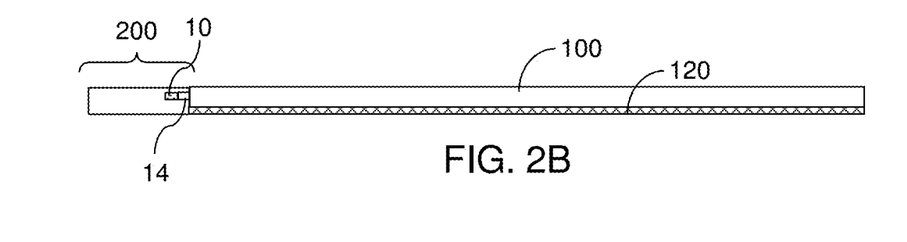
FIG. 2B is a vertical cross-sectional view of the exemplary integrated back light unit of FIG. 2A.

Referring to FIGS. 2A and 2B, an integrated back light unit according to an embodiment of the present disclosure is illustrated, which includes a light guide plate 100 and a light bar 200. The light bar includes a light emitting device assembly, such as an LED assembly 30, which includes a periodic array of multiple types of light emitting devices (e.g., LEDs) 10. The multiple types of light emitting diodes 10 can include first color light emitting LEDs (i.e., first-type light emitting diodes) 10R, second color light emitting LEDs (i.e., second-type light emitting diodes) 10B, and third color light emitting LEDs (i.e., third-type light emitting diodes) 10G. Multiple instances of the set of a first-type light emitting diode 10R, a third-type light emitting diode 10G, and a second-type light emitting diode 10B are repeated along the lengthwise direction LD of the LED assembly 30.

Electrical wiring can be provided to provide electrical power to light emitting devices 10 in the LED assembly 30. The electrical wiring can be provided, for example, by a printed circuit board (PCB) 40, which may be, for example, flexible circuit board (FCB). Electrical connectors 50 can be provided at one side of the light bar 200 to provide an interface between the electrical wires on the PCB and a power supply socket to which the light bar is mounted. Optionally, an optical launch 14 may be provided between one of more types of light emitting devices (10R, 10B, or 10G) in the light bar and the LGP, if present, may include a phosphor or dye material mixed in with the silicone, polymer, and/or epoxy. Optionally, a reflector plate 120 can be provided on the backside of the light guide plate 100 to increase reflection of the light from the LED assembly to the front side of the integrated back light unit.

The light guide plate 100 and the optional reflector plate 120 collectively constitute a light guide unit (100, 120). The light guide unit (100, 120) is optically coupled to the light emitting devices (10R, 10B, 10G), and is configured to reflect light from light emitting devices (10R, 10B, 10G) to provide illumination over an area, which is the illumination are of the integrated back light unit.

Figure 3:
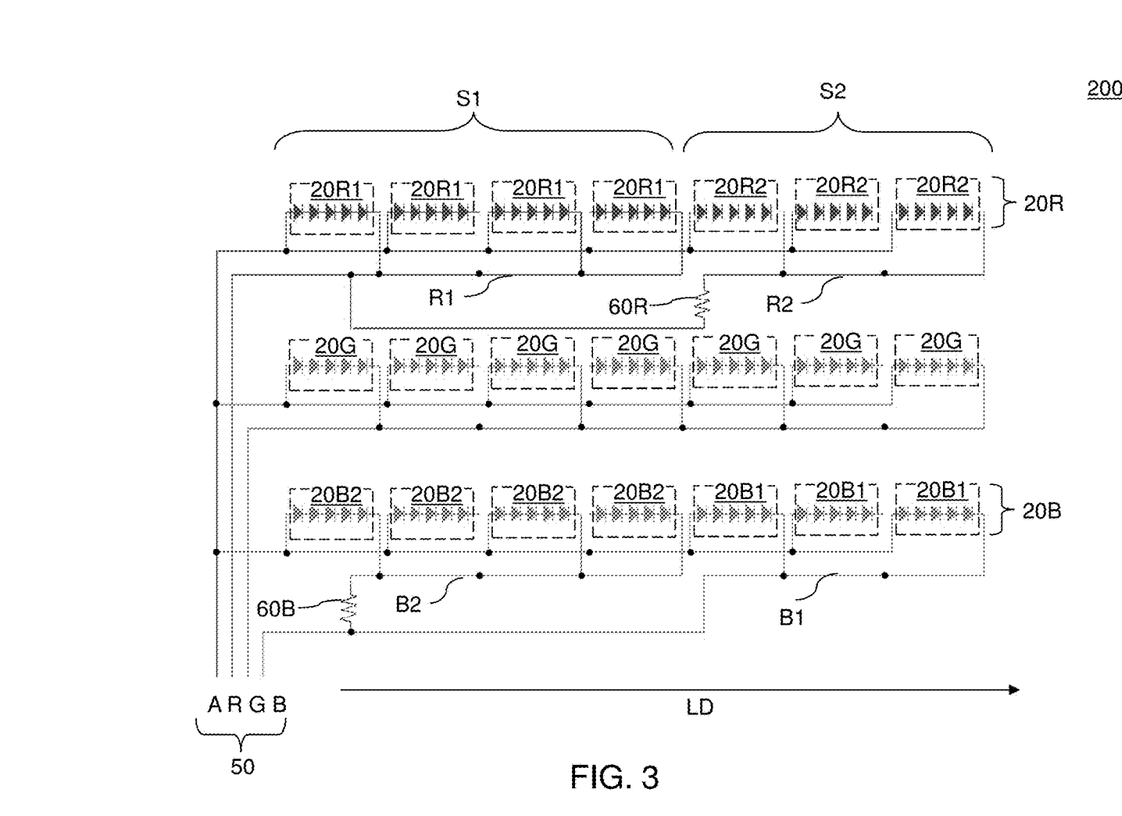
FIG. 3 is a circuit diagram of a light bar according to an embodiment of the present disclosure is illustrated.

Referring to FIG. 3, a circuit diagram for devices in the light bar 200 schematically illustrates the various components and electrical connections within the light bar 200. The first-type light emitting devices 10R are configured as first-type light emitting device (e.g., LED) strings 20R. Each first-type LED string 20R includes a series connection of first color light emitting LEDs. For example, first-type LED strings 20R may be red light emitting LEDs. The strings 20R extend along the lengthwise direction LD in the LED assembly 30, which can be the same as the lengthwise direction LD of the printed circuit board 40. Each first-type LED string includes a series connection of first-type light emitting devices (e.g., LEDs) 10R that emit light at or about a first peak wavelength. In one embodiment, the first peak wavelength can be about 630 nm, and the first light can be a red light.

The LED assembly 30 further includes second-type LED strings 20B extending along the lengthwise direction LD in the LED assembly 30. Each second-type LED string 20B includes a series connection of second color light emitting LEDs. For example, second-type LED strings 20B may be blue light emitting LEDs. Each second-type LED string 20B includes a series connection of second-type light emitting devices (e.g., LEDs) 10B, which are light emitting devices that emit light at or about a second peak wavelength that is different from the first peak wavelength. In one embodiment, the second peak wavelength can be about 460 nm, and the second light can be blue light.

The LED assembly 30 can further include third-type LED strings 20G extending along the lengthwise direction LD in the LED assembly 30. Each third-type LED string 20G includes a series connection of third color light emitting LEDs. For example, third-type LED strings 20G may be green light emitting LEDs. Each third-type LED string 20G includes a series connection of third-type light emitting devices (e.g., LEDs) 10G, which are light emitting devices that emit light at or about a third peak wavelength that is different from the first peak wavelength and from the second peak wavelength. In one embodiment, the third peak wavelength can be about 560 nm, and the third light can be green light.

A first set of electrical wires can be provided on the PCB 40 in the light bar 200. The first set of electrical wires can be configured to power the first-type LED strings 20R by distributing a first power supply voltage applied to a first pair of electrical connectors (R, A), which is a first subset of the electrical connectors 50. The first set of electrical wires can include all electrical wiring between the first pair of electrical connectors (R, A) and the first-type LED strings 20R, and is employed to power the first-type (e.g., red light emitting) LED strings 20R.

One of the first pair of electrical connectors (R, A), such as connector R, contains two electrical connector branches R1, R2 in parallel. The first branch R1 connects the connector R to a first subset of the first-type LED strings 20R1. The second branch R1 connects the connector R to a first electrical load 60R and a second subset of the first-type LED strings 20R2 in series. The second subset of the first-type LED strings may include one or more strings 20R2 which contain one or more LEDs 10R that are located at the first edge of the light bar. In contrast, the first subset of the first-type LED strings may include one or more strings 20R1 which do not contain one or more LEDs 10R that are located at the edge of the light bar. Thus, the second subset of the first-type LED strings 20R2 are connected in series with a higher electrical load (e.g., resistor) 60R than the second subset of the first-type LED strings 20R1. Preferably, the first subset of the first-type LED strings 20R1 lacks any resistor placed in series (e.g., on connector R1) with the strings 20R1. However, in an alternative embodiment, one or more lower resistance value resistors is connected in series with the first subset of the first-type LED strings 20R1 and one or more higher resistance value resistors is connected in series with the second subset of the first-type LED strings 20R2. Preferably, each LED 10R in the first and second subset of strings is the same.

During operation, each first-type LED string 20R1 within a first subset of the first-type LED strings 20R can be configured to be provided with substantially the same current as the current applied across the first pair of electrical connectors (R, A) and across all third-type LED strings 20G. As used herein, a first current is substantially the same as a second current if the ratio of the first current to the second current is in a range from 0.995 to 1.005. In contrast, during operation, due to the presence of the first electrical load 60R, each first-type LED string 20R2 within a second subset of the first-type LED strings 20R can be configured to be provided with a current that is less than the current provided to the first-type LED strings 20R1 within the first subset of the first-type LED strings 20R.

In one embodiment, each first-type LED string 20R1 within the first subset of the first-type LED strings 20R can be in a parallel connection with respect to one another, and in a series connection with electrical connector (e.g., one or more wires) R1 connected to a first power supply voltage electrical connector R and with electrical wires connected to a ground voltage electrical connector A. In one embodiment, each first-type LED string 20R2 within the second subset of the first-type LED strings 20R can be in a parallel connection with respect to one another, and in a series connection with the first electrical load 60R, with electrical connector (e.g., one or more wires) R2 connected to a first power supply voltage electrical connector R, and with electrical wires connected to a ground voltage electrical connector A.

In one embodiment, the resistance of electrical connectors (e.g., wires) for any circuit between the first pair of electrical connectors (R, A) (which is the same as the resistance of the corresponding circuit less the resistance of a first-type LED string 20R and less the resistance of the first electric load 60R if present in the specific portion of the circuit) can be less than 0.5 Ohm, and can be less than 0.1 Ohm, and can be less than 0.02 Ohm.

A second set of electrical wires can be configured to power the second-type LED strings 20B by distributing a second power supply voltage applied to a second pair of electrical connectors (B, A), which is a second subset of the electrical connectors 50. One electrical connector A (which can be a ground terminal) may be common between the first subset (R, A) and the second subset (B, A) of the electrical connectors 50.

One of the second pair of electrical connectors (B, A), such as connector B, contains two electrical connector branches B1, B2 in parallel. The first branch B1 connects the connector B to a first subset of the second-type LED strings 20B1. The second branch B1 connects the connector B to a second electrical load 60B and a second subset of the second-type LED strings 20B2 in series. The second subset of the second-type LED strings may include one or more strings 20B2 which contain one or more LEDs 10B that are located at the second edge of the light bar opposite to the first edge of the light bar. In contrast, the first subset of the second-type LED strings may include one or more strings 20B1 which do not contain one or more LEDs 10B that are located at the second edge of the light bar. Thus, the second subset of the second-type LED strings 20B2 are connected in series with a higher electrical load (e.g., resistor) 60B than the second subset of the second-type LED strings 20B1. Preferably, the first subset of the second-type LED strings 20B1 lacks any resistor placed in series (e.g., on connector B1) with the strings 20B1. However, in an alternative embodiment, one or more lower resistance value resistors is connected in series with the first subset of the second-type LED strings 20B1 and one or more higher resistance value resistors is connected in series with the second subset of the second-type LED strings 20B2. Preferably, each LED 10B in the first and second subset of strings is the same.

During operation, each second-type LED string 20B1 within a first subset of the second-type LED strings 20B can be configured to be provided with substantially the same current as the current applied across the second pair of electrical connectors (B, A) and across all third-type LED strings 20G. In contrast, during operation, due to the presence of the second electrical load 60B, each second-type LED string 20B2 within a second subset of the second-type LED strings 20B can be configured to be provided with a current that is less than the current provided to the second-type LED strings 20B1 within the first subset of the second-type LED strings 20B.

In one embodiment, each second-type LED string 20B1 within the first subset of the second-type LED strings 20B can be in a parallel connection with respect to one another, and in a series connection with electrical connector (e.g., one or more wires) B1 connected to a first power supply voltage electrical connector B and with electrical wires connected to a ground voltage electrical connector A. In one embodiment, each second-type LED string 20B2 within the second subset of the second-type LED strings 20B can be in a parallel connection with respect to one another, and in a series connection with the second electrical load 60B, with electrical connector (e.g., one or more wires) B2 connected to a first power supply voltage electrical connector B, and with electrical wires connected to a ground voltage electrical connector A.

In one embodiment, the resistance of electrical connectors (e.g., wires) for any circuit between the second pair of electrical connectors (B, A) (which is the same as the resistance of the corresponding circuit less the resistance of a second-type LED string 20B and less the resistance of the second electric load 60B if present in the specific portion of the circuit) can be less than 0.5 Ohm, and can be less than 0.1 Ohm, and can be less than 0.02 Ohm.

A third set of electrical wires can be configured to power the third-type LED strings 20G by distributing a second power supply voltage applied to a third pair of electrical connectors (G, A), which is a third subset of the electrical connectors 50. One electrical connector A (which can be a ground terminal) may be common between the first subset (R, A), the second subset (B, A) and the third subset (G, A) of the electrical connectors 50. Each third-type LED string 20G within the third-type LED strings can be configured to be provided with a substantially same voltage as the third power supply voltage, which is applied across a third pair of electrical connectors (G, A). Each third-type LED string 20G within the third-type LED strings can be configured to be provided with the same current during operation. Preferably, none of the third-type LED strings 20G are connected in series of an electrical load (e.g., resistor).

In one embodiment, the first electrical load 60R can include at least one first resistor that is present between one of the first pair of electrical connectors (R, A) and each first-type LED strings 20R2 within the second subset. In one embodiment, the first-type LED strings 20R1 within the first subset are in a parallel connection with one another, the first-type LED strings 20R2 within the second subset are in a parallel connection with one another, and the at least one first resistor 60R that is present between one of the first pair of electrical connectors (R, A) and each first-type LED strings 20R2 within the second subset is in a series connection with the second subset of the first-type LED strings 20R2.

In one embodiment, the at least one first resistor 60R has a resistance that is at least one order of magnitude greater than the mean resistance of electrically conductive paths between one of the first pair of electrical connectors (R, A) (such as branch electrical connector R1) and each of the first-type LED strings 20R1 within the first subset of the first-type LED strings. In one embodiment, the resistance of the at least one first resistor 60R can be selected to reduce the current applied via branch electrical connector R2 and connector A to each first-type LED string 20R2 within the second subset of the first-type LED strings 20R by at least 1%, such as by 1-20%, for example 5-10% relative to the current applied via branch electrical connector R1 and connector A to each first-type LED string 20R1 within the first subset of the first-type LED strings 20R. In one embodiment, the resistance of the at least one first resistor 60R can be at least 1 Ohm, such as 1-20 Ohm, for example 5-10 Ohm.

In one embodiment, the resistance of the at least one first resistor 60R can be selected such that the average intensity of light emitted from first-type light emitting devices 20R1 within the second subset of the first-type LED strings is at least 3% less, such as 3-20% less, for example 5-10% less than average intensity of light emitted from first-type light emitting devices within the first subset of the first-type LED strings.

In one embodiment, the first subset 20B1 of the second-type LED strings 20B can be interlaced with the second subset 20R2 of the first-type LED strings 20R, and the second subset 20B2 of the second-type LED strings 20B can be interlaced with the first subset 20R1 of the first-type LED strings 20R. In one embodiment, each first-type LED string 20R2 within the second subset of the first-type LED strings 20R can be interlaced with a second-type LED string 20B1 within the first subset of the second-type LED strings 20B. Additionally, each first-type LED string 20R1 within the first subset of the first-type LED strings 20R can be interlaced with a second-type LED string 20B2 within the second subset of the second-type LED strings 20B. As used herein, first elements are interlaced with second elements if instances of the first elements and instances of the second elements appear alternately within a one-dimensional array of the first elements and the second elements.

The first subset 20B1 of the second-type LED strings 20B that is interlaced with the second subset 20R2 of the first-type LED strings 20R can be located at one end of the LED assembly 30 that terminates with a first-type light emitting diode 10R. The second subset 20B2 of the second-type LED strings 20B that is interlaced with the second subset 20R1 of the first-type LED strings 20R can be located at another end of the LED assembly 30 that terminates with a second-type light emitting diode 10B.

In the absence of the at least one first resistor 60R, the second end of an LED assembly 30 (e.g., second edge of the light bar) that terminates with a first-type light emitting diode 10R will generate light that is more rich in the color of the first-type light emitting diode 10R (e.g., more rich in red) than the color of the second-type light emitting diode 10B (e.g., blue). The presence of the at least one first resistor 60R attenuates the light of the color of the first-type light emitting diodes 10R, thereby balancing the intensity distribution of the three different colors and causing the overall color composition to approach the color composition in regions proximal to the center of the LED assembly 30. Preferably, there is no resistor that is provided in series with the second and third type light emitting diodes 10B and 10G at the second end of the LED assembly 30 (e.g., second edge of the light bar).

Likewise, in the absence of the at least one second resistor 60B, the other (first) end of the LED assembly 30 (e.g., the first edge of the light bar) that terminates with a second-type light emitting diode 10B will generate light that is more rich in the color of the second-type light emitting diode 10B (e.g., more rich in blue) than the color of the first-type light emitting diode 10R (e.g., red). The presence of the at least one second resistor 60B attenuates the light of the color of the second-type light emitting diodes 10B, thereby balancing the intensity distribution of the three different colors and causing the overall color composition to approach the color composition in regions proximal to the center of the LED assembly 30. Preferably, there is no resistor that is provided in series with the first and the third type light emitting diodes 10R and 10G at the first end of the LED assembly 30 (e.g., first edge of the light bar).

For example, the first subset 20R1 of the first-type LED strings 20R can be located at a first side S1 of the LED assembly 30, and the second subset 20R2 of the first-type LED strings 20R can be located at a second side S2 of the LED assembly 30 that is the opposite side of the first side S1. One of the first-type light emitting devices 10R can be located at an end position of the LED assembly 30 at the first side S1 (i.e., be the outermost light emitting device at the first side S1).

In addition, the first subset 20B1 of the second-type LED strings 20B can be located at the second side S2 of the LED assembly 30, the second subset 20B2 of the second-type LED strings 20B can be located at the first side S1 of the LED assembly 30, and one of the second-type light emitting devices 10B can be located at another (second) end position of the LED assembly 30 that is located at the second side S2 (i.e., be the outermost light emitting device at the second side S2).

In one embodiment, each of the first-type LED strings 20R can have the same number of first-type light emitting devices 10R in a series connection. Each of the second-type LED strings 20B can have the same number of second-type light emitting devices 10B in a series connection. Each of the third-type LED strings 20G can have the same number of third-type light emitting devices 10G in a series connection.

In an illustrative example, the first-type light emitting devices 10R can emit red light, the second-type light emitting devices 10B cab emit blue light, and the third-type light emitting devices 10G can emit green light.

Figure 4:
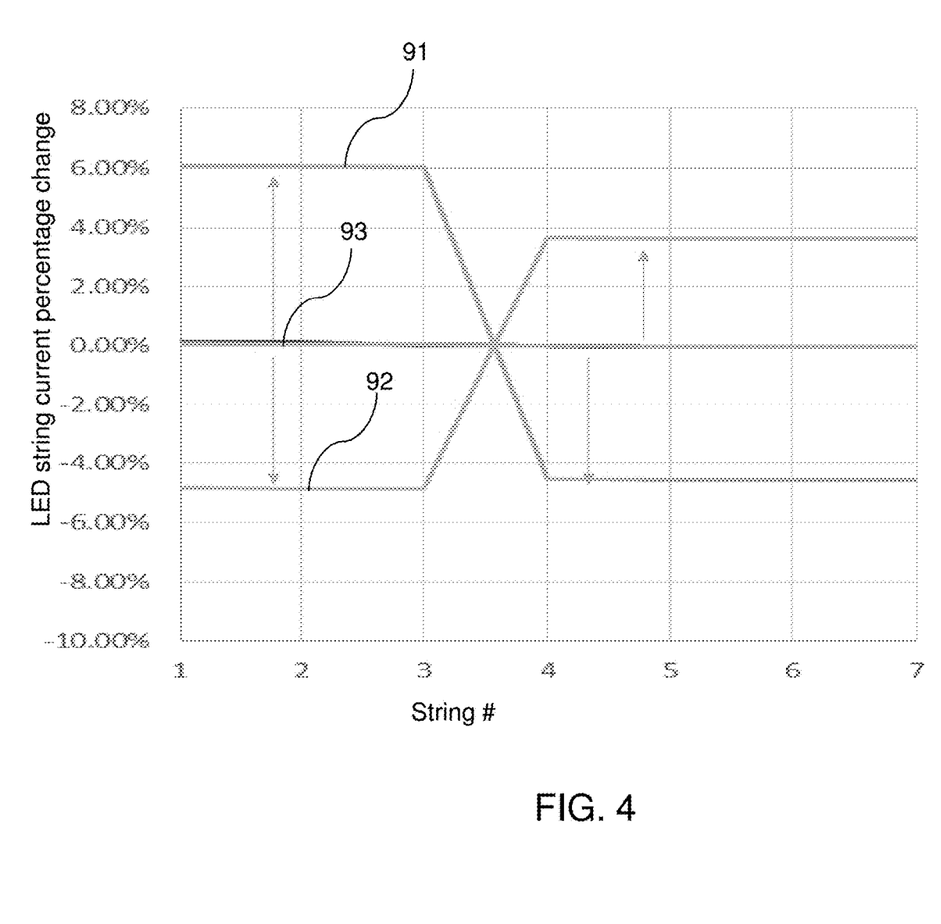
FIG. 4 is a simulated plot of change in LED string current versus LED string number of various color LED strings for a first exemplary light bar according to an embodiment of the present disclosure.
Figure 5:
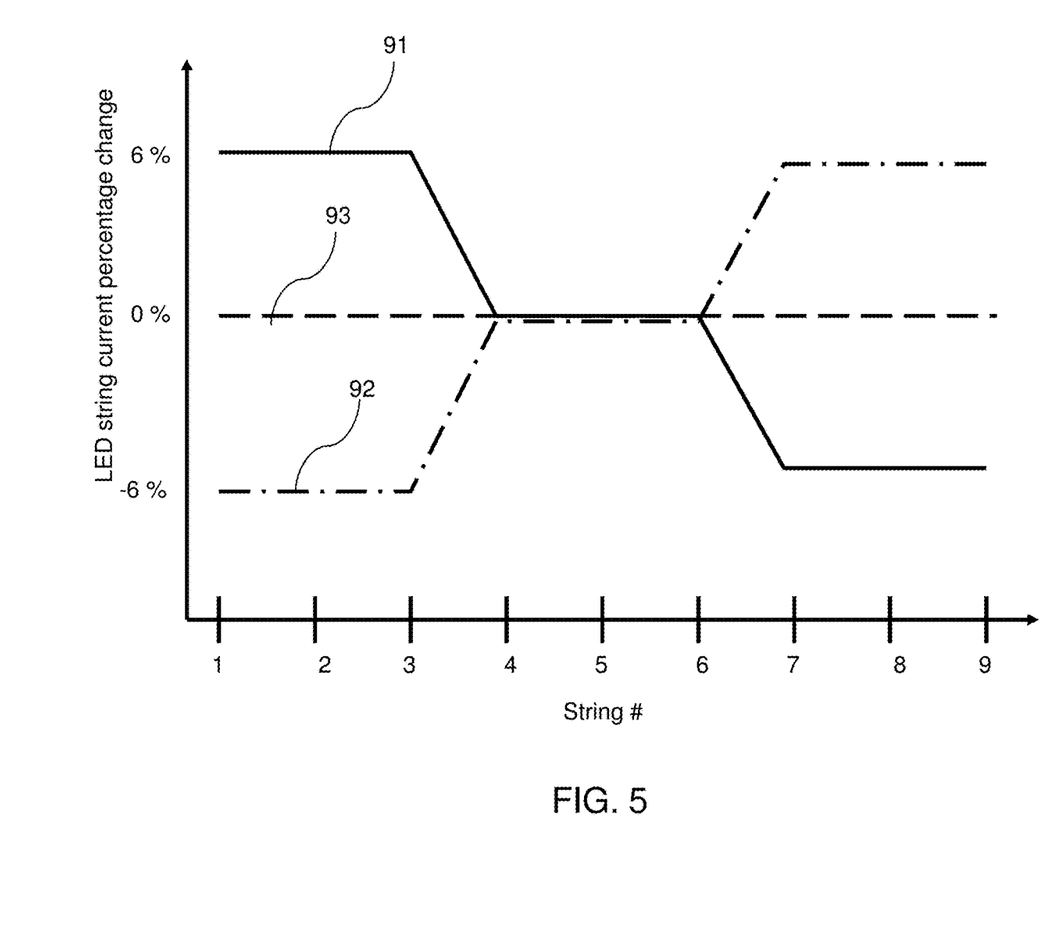
FIG. 5 is a simulated plot of change in LED string current versus LED string number of various color LED strings for a second exemplary light bar according to an embodiment of the present disclosure.

FIGS. 4 and 5 illustrate simulated plots of change in LED string current versus LED string number of various color LED strings for a first exemplary light bar and for a second exemplary light bar, respectfully. The LED string current percentage change (i.e., difference) plotted in FIGS. 4 and 5 is with respect the mean LED current string current for a corresponding LED string in a comparative circuit in which no resistive load is employed (e.g., for a string of green light emitting devices 10G). The first resistive load in these figures is a 5 Ohm resistor.

A red LED curve 91 corresponds to the LED string current percentage change for red-light-emitting first-type light emitting devices. The current difference is positive for the LED strings 20R1 on the first side of the light bar which are not connected in series with the first resistor 60R and the current difference is negative for the LED strings 20R2 on the second side of the light bar which are connected in series with the first resistor 60R.

A blue LED curve 92 corresponds to the LED string current percentage change for blue-light-emitting second-type light emitting devices. The current difference is positive for the LED strings 20B1 on the second side of the light bar which are not connected in series with the second resistor 60B and the current difference is negative for the LED strings 20B2 on the first side of the light bar which are connected in series with the second resistor 60B.

A green LED curve 93 corresponds to the LED string current percentage change for green-light-emitting third-type light emitting devices. In this case, the LED assembly 30 can have a repetition of a group of diodes including, from one side to another, a red LED, a green LED, and a blue LED, such that less current flows to the strings for red LEDs that are located at the second side of the LED assembly that terminates with a red LED compared to the strings for red LEDs that are located at the opposite side. Further, less current can flow to the strings for blue LEDs that are located at the first side of the LED assembly that terminates with a blue LED compared to the strings for blue LEDs that are located on the first side that terminates with the red LED.

Examples

The configurations of the present disclosure can be employed to provide an integrated back light unit that provides more uniform color distribution than prior art devices.

Figure 6:
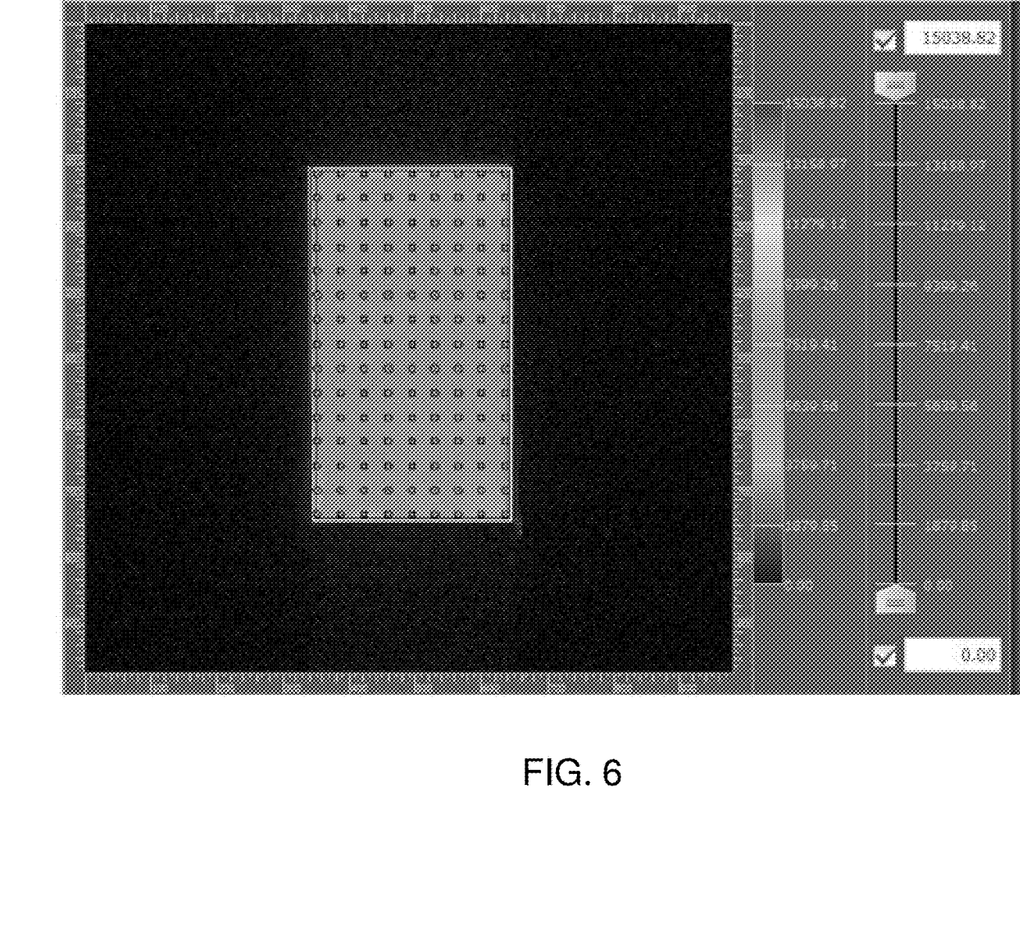
FIG. 6 is an exemplary 135 point test pattern for measuring uniformity of color spectrum of an integrated back light unit.

Referring to FIG. 6, an exemplary test pattern for measuring uniformity of color spectrum of an integrated back light unit having a light bar with two five Ohm resistors connected in a similar manner to that shown in FIG. 3 is illustrated. The exemplary test pattern employs a 135 point measurement scheme over the illumination area of the integrated back light unit. The circles represent the measurement areas. The light bar is located at the bottom of the rectangle representing the illumination area. Measured color uniformity data is tabulated in Table 1 for four light bars (row 1=light bar with no resistor, row 2=light bar contains first resistor 60R only, row 3=light bar contains both first and second resistors 60R and 60B, row 4=light bar contains second resistor 60B only).

In the tables below, "R_red" refers to the mean resistance of first electrical wiring between the first pair of electrical connectors (R, A) and each first-type LED string 20R. 0 Ohms corresponds to an electrical short, which has an electrical resistance less than 0.1 Ohm, and can have an electrical resistance less than 0.05 Ohm. "R_blue" refers to the mean resistance of second electrical wiring between the second pair of electrical connectors (B, A) and each second-type LED string 20B. The greater the value of Tcp, the more uniform the color distribution of the illumination provided by the integrated back light unit. Compared to the prior art, no resistor light bar where R_red and R_blue are less than 0.05 Ohm, the light bar of the embodiments of the present disclosure having at least one resistor and preferably two resistors as shown in FIG. 3 exhibits a 13% improvement in Tcp.

TABLE 1

135 point color uniformity measurement data

| R_red (Ohms) | R_blue (Ohms) | Lv | Std. x | y | Tcp | Uniformity Lv | Tcp |
|---|---|---|---|---|---|---|---|
| <0.05 | <0.05 | 618.03 | 0.0054 | 0.0079 | 755 | 59.09 | 65.49 |
| 5.0 | <0.05 | 632.84 | 0.0055 | 0.0080 | 719 | 57.73 | 67.29 |
| 5.0 | 5.0 | 619.85 | 0.0062 | 0.0054 | 633 | 59.72 | 78.50 |
| <0.05 | 5.0 | 616.21 | 0.0058 | 0.0049 | 614 | 59.61 | 78.59 |

Figure 7:
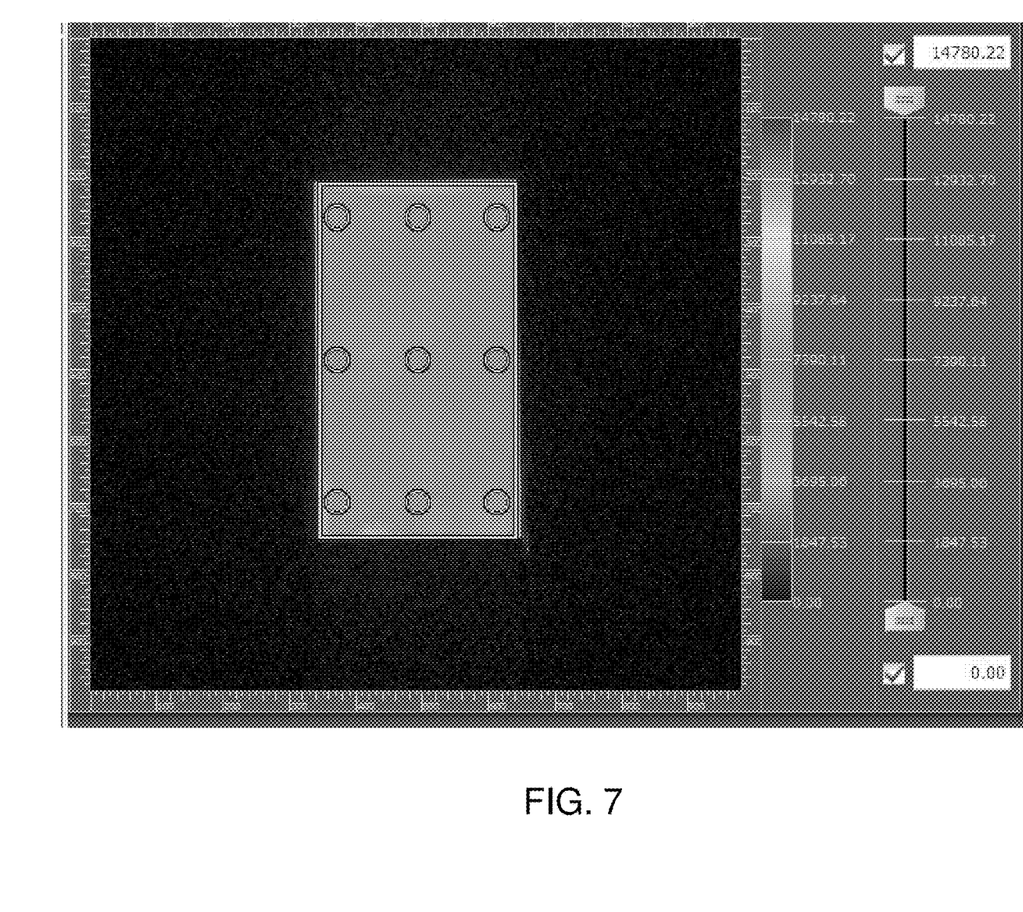
FIG. 7 is an exemplary 9 point test pattern for measuring uniformity of color spectrum of an integrated back light unit.

Referring to FIG. 7, an exemplary test pattern for measuring uniformity of color spectrum of an integrated back light unit having a light bar with two five Ohm resistors connected in a similar manner to that shown in FIG. 3 is illustrated. The exemplary test pattern employs a 9 point measurement scheme over the illumination area of the integrated back light unit. The circles represent the measurement areas. The light bar is located at the bottom of the rectangle representing the illumination area. Measured color uniformity data is tabulated in Table 2.

TABLE 2

9 point color uniformity measurement data

| R_red (Ohms) | R_blue (Ohms) | Std. | | | | Uniformity | |
|---|---|---|---|---|---|---|---|
| | | Lv | x | y | Tcp | Lv | Tcp |
| <0.05 | <0.05 | 400.30 | 0.0053 | 0.0090 | 677 | 84.61 | 80.35 |
| 5.0 | <0.05 | 425.39 | 0.0056 | 0.0095 | 617 | 83.85 | 82.31 |
| 5.0 | 5.0 | 400.68 | 0.0067 | 0.0060 | 565 | 85.12 | 85.78 |
| <0.05 | 5.0 | 387.81 | 0.0060 | 0.0060 | 534 | 85.68 | 86.60 |

The parameters of Table 2 are the same as the parameters of Table 1. Compared to the prior art no resistor light bar where R_red and R_blue are less than 0.05 Ohm, the light bar of the embodiments of the present disclosure having at least one resistor and preferably two resistors as shown in FIG. 3 exhibits a 6% improvement in Tcp.

Figure 8:
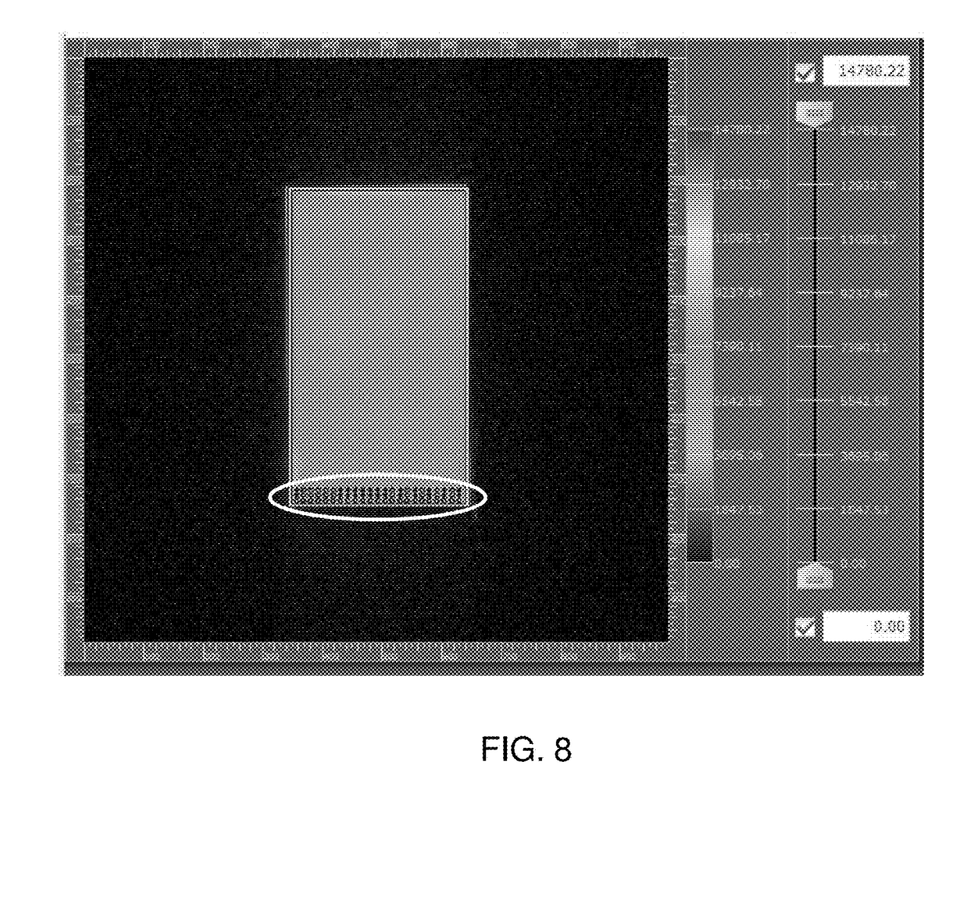
FIG. 8 is an exemplary 69 point test pattern for measuring uniformity of color spectrum of an integrated back light unit.

Referring to FIG. 8, an exemplary test pattern for measuring uniformity of color spectrum of an integrated back light unit having a light bar with two five Ohm resistors connected in a similar manner to that shown in FIG. 3 is illustrated. The exemplary test pattern employs a 69 point measurement scheme at a peripheral region in proximity to the light bar of the integrated back light unit. The black regions represent the measurement areas. The light bar is located at the bottom of the rectangle representing the illumination area. Measured color uniformity data is tabulated in Table 3.

TABLE 3

69 point color uniformity measurement data at a peripheral region in proximity to the light bar

| R_red (Ohms) | R_blue (Ohms) | Std. | | | | Uniformity | |
|---|---|---|---|---|---|---|---|
| | | Lv | x | y | Tcp | Lv | Tcp |
| <0.05 | <0.05 | 901.40 | 0.0046 | 0.0183 | 1218 | 59.15 | 63.63 |
| 5.0 | <0.05 | 963.78 | 0.0059 | 0.0188 | 1135 | 57.52 | 62.03 |
| 5.0 | 5.0 | 903.66 | 0.0096 | 0.0112 | 722 | 59.4 | 72.17 |
| <0.05 | 5.0 | 860.68 | 0.0080 | 0.0103 | 675 | 60.44 | 73.06 |

The parameters of Table 3 are the same as the parameters of Table 1. Compared to the prior art no resistor light bar where R_red and R_blue are less than 0.05 Ohm, the light bar of the embodiments of the present disclosure having at least one resistor and preferably two resistors as shown in FIG. 3 exhibits a 9% improvement in Tcp.

Figure 9:
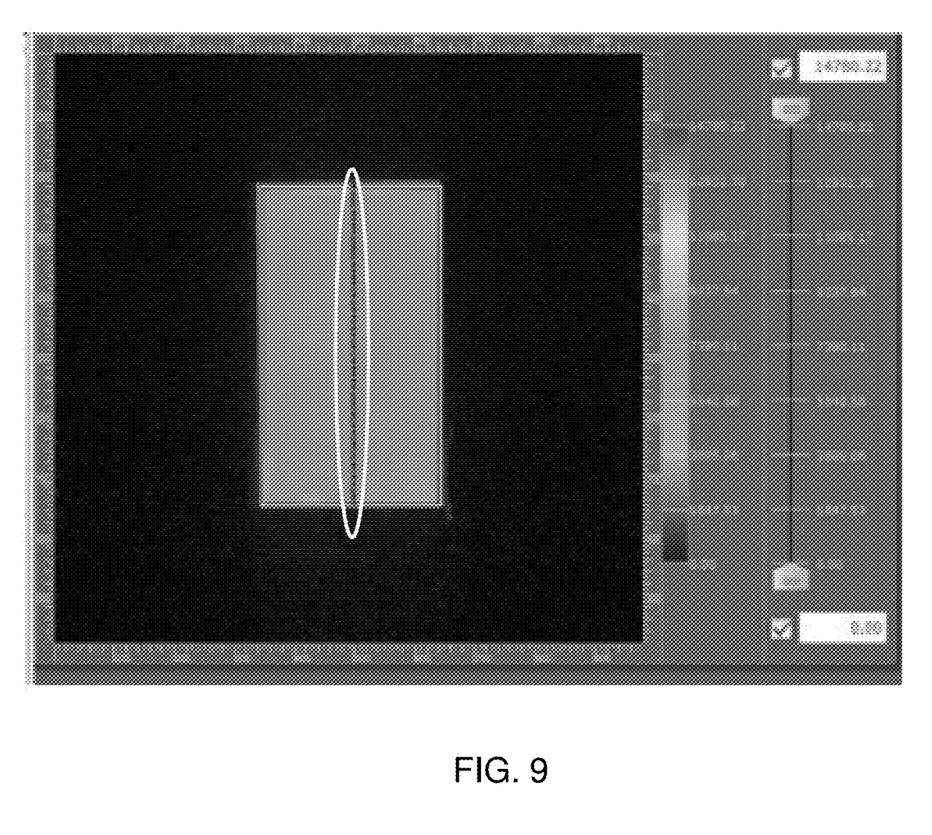
FIG. 9 is an exemplary 50 point test pattern for measuring uniformity of color spectrum of an integrated back light unit.

Referring to FIG. 9, an exemplary test pattern for measuring uniformity of color spectrum of an integrated back light unit having a light bar with two five Ohm resistors connected in a similar manner to that shown in FIG. 3 is illustrated. The exemplary test pattern employs a 50 point measurement scheme along the general direction of light propagation in the light guide plate of the integrated back light unit. The circled vertical line represents the measurement areas. The light bar is located at the bottom of the rectangle representing the illumination area. Measured color uniformity data is tabulated in Table 4.

TABLE 4

50 point color uniformity measurement data along the general direction of light propagation in the light guide plate

| R_red (Ohms) | R_blue (Ohms) | Std. | | | | Uniformity | |
|---|---|---|---|---|---|---|---|
| | | Lv | x | y | Tcp | Lv | Tcp |
| <0.05 | <0.05 | 640.80 | 0.0047 | 0.0057 | 620 | 61.17 | 79.28 |
| 5.0 | <0.05 | 637.90 | 0.0047 | 0.0054 | 609 | 60.57 | 79.36 |
| 5.0 | 5.0 | 654.86 | 0.0044 | 0.0042 | 508 | 60.37 | 83.55 |
| <0.05 | 5.0 | 666.51 | 0.0045 | 0.0044 | 519 | 59.96 | 82.95 |

The parameters of Table 4 are the same as the parameters of Table 1. Compared to the prior art no resistor light bar where R_red and R_blue are less than 0.05 Ohm, the light bar of the embodiments of the present disclosure having at least one resistor and preferably two resistors as shown in FIG. 3 exhibits a 4% improvement in Tcp.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art.

What is claimed is:

1. A device, comprising:
a plurality of first color light emitting LEDs comprising a first subset of first color light emitting LEDs and a second subset of first color light emitting LEDs;
a plurality of second color light emitting LEDs, wherein the second color is different from the first color; and
a plurality of third color light emitting LEDs, wherein the third color is different from the first and the second colors;
wherein the second subset of first color light emitting LEDs is electrically connected in series with a larger electrical load between a first electrical connector and a second electrical connector than the first subset of first color light emitting LEDs between the first electrical connector and the second electrical connector to provide a lesser electrical current through each string of first color light emitting LEDs within the second subset of first color light emitting LEDs than electrical current provided through each string of first color light emitting LEDs within the first subset of first color light emitting LEDs.

2. The device of claim 1, wherein the second subset of first color light emitting LEDs is electrically connected in series with a first resistor and the first subset of first color light emitting LEDs is not electrically connected in series with a resistor.

3. The device of claim 2, wherein in operation, the first subset of first color light emitting LEDs and the plurality of third color light emitting LEDs are provided with substantially the same first current and the second subset of first color light emitting LEDs is provided with a second current which is lower than the first current.

4. The device of claim 2, wherein the plurality of second color light emitting LEDs comprise a first subset of second color light emitting LEDs and a second subset of second color light emitting LEDs, and the second subset of second color light emitting LEDs is electrically connected in series with a larger electrical load than the first subset of second color light emitting LEDs.

5. The device of claim 4, wherein the second subset of second color light emitting LEDs is electrically connected in series with a second resistor and the first subset of second color light emitting LEDs is not electrically connected in series with a resistor, and wherein the plurality of third color light emitting LEDs is not electrically connected in series with a resistor.

6. The device of claim 4, wherein in operation, the first subset of second color light emitting LEDs and the plurality of third color light emitting LEDs are provided with substantially the same first current and the second subset of second color light emitting LEDs is provided with a third current which is lower than the first current.

7. The device of claim 4, wherein:
the device comprises a light bar;
the second subset of the first color emitting LEDs contains one or more first color emitting LEDs that are located at a first edge of the light bar and the first subset of the first color emitting LEDs does not contain any first color emitting LEDs that are located at the first edge of the light bar; and
the second subset of the second color emitting LEDs contains one or more second color emitting LEDs that are located at a second edge of the light bar and the first subset of the second color emitting LEDs does not contain any second color emitting LEDs that are located at the second edge of the light bar.

8. The device of claim 4, wherein:
the device comprises a light bar;
the plurality of first color light emitting LEDs comprise first-type LED strings extending along a lengthwise direction in the light bar;
each first-type LED string includes a series connection of first color light emitting LEDs;
the plurality of second color light emitting LEDs comprise second-type LED strings extending along the lengthwise direction in the light bar;
each second-type LED string includes a series connection of second color light emitting LEDs;
the plurality of third color light emitting LEDs comprise third-type LED strings extending along the lengthwise direction in the light bar; and
each third-type LED string includes a series connection of third color light emitting LEDs.

9. The device of claim 8, wherein the first resistor is located between one of a first pair of electrical connectors and each first-type LED string within the second subset.

10. The device of claim 9, wherein:
the first-type LED strings within the first subset are in a parallel connection with one another;
the first-type LED strings within the second subset are in a parallel connection with one another, and
the first resistor is in a series connection with the second subset of the first-type LED strings.

11. The device of claim 10, wherein the first resistor has a resistance that is at least one order of magnitude greater than a mean resistance of electrically conductive paths between the first pair of electrical connectors and each of the first-type LED strings within the first subset of the first-type LED strings.

12. The device of claim 8, wherein:
the first subset of the second-type LED strings is interlaced with the second subset of the first-type LED strings; and
the second subset of the second-type LED strings is interlaced with the first subset of the first-type LED strings.

13. The device of claim 1, wherein the first color comprises red, the second color comprises blue, and the third color comprises green.

14. An integrated back light unit, comprising:
the device of claim 1 which comprises a light bar; and
a light guide plate optically coupled to the light bar.

15. A method of operating a device, comprising:
emitting a first color light from a plurality of first color light emitting LEDs comprising a first subset of first color light emitting LEDs and a second subset of first color light emitting LEDs;
emitting a second color light from a plurality of second color light emitting LEDs, wherein the second color is different from the first color; and
emitting a third color light from a plurality of third color light emitting LEDs, wherein the third color is different from the first and the second colors;
wherein the second subset of first color light emitting LEDs is electrically connected in series with a larger electrical load between a first electrical connector and a second electrical connector than the first subset of first color light emitting LEDs between the first electrical connector and the second electrical connector to provide a lesser electrical current provided through each string of first color light emitting LEDs within the second subset of first color light emitting LEDs than electrical current through each string of first color light emitting LEDs within the first subset of first color light emitting LEDs.

16. The method of claim 15, wherein the first subset of first color light emitting LEDs and the plurality of third color light emitting LEDs are provided with substantially the same first current and the second subset of first color light emitting LEDs is provided with a second current which is lower than the first current such that the first subset of first color light emitting LEDs emit a higher intensity first color light than the second subset of first color light emitting LEDs.

17. The method of claim 16, wherein the second subset of first color light emitting LEDs is electrically connected in series with a first resistor and the first subset of first color light emitting LEDs is not electrically connected in series with a resistor.

18. The method claim 16, wherein:
the plurality of second color light emitting LEDs comprise a first subset of second color light emitting LEDs and a second subset of second color light emitting LEDs;
the first subset of second color light emitting LEDs and the plurality of third color light emitting LEDs are provided with substantially the same first current and the second subset of second color light emitting LEDs is provided with a third current which is lower than the first current such that the first subset of second color light emitting LEDs emit a higher intensity second color light than the second subset of second color light emitting LEDs; and the second subset of second color light emitting LEDs is electrically connected in series with a larger electrical load than the first subset of second color light emitting LEDs.

19. The method claim 18, wherein:

the device comprises a light bar;

the second subset of the first color emitting LEDs contains one or more first color emitting LEDs that are located at a first edge of the light bar and the first subset of the first color emitting LEDs does not contain any first color emitting LEDs that are located at the first edge of the light bar; and the second subset of the second color emitting LEDs contains one or more second color emitting LEDs that are located at a second edge of the light bar and the first subset of the second color emitting LEDs does not contain any second color emitting LEDs that are located at the second edge of the light bar.

20. The method claim 19, wherein:

the first color comprises red, the second color comprises blue, the third color comprises green and a combination of the red, blue and green colors appears as white light to a human observer; and the white light is provided into a light guide plate of a back light unit in a display device.

* * * * *